May 29, 1923.

W. F. H. BRAUN

MEAT HOLDER

Filed May 1, 1922

WITNESS:
Rob¹ R. Kitchel

INVENTOR
William F. H. Braun
BY
Augustus B. Stoughton
ATTORNEY.

Patented May 29, 1923.

1,456,866

UNITED STATES PATENT OFFICE.

WILLIAM F. H. BRAUN, OF PHILADELPHIA, PENNSYLVANIA.

MEAT HOLDER.

Application filed May 1, 1922. Serial No. 557,554.

*To all whom it may concern:*

Be it known that I, WILLIAM F. H. BRAUN, a citizen of the United States, residing at Philadelphia, in the county of Philadelphia and State of Pennsylvania, have invented a new and useful Improvement in Meat Holders, of which the following is a specification.

The principal object of the present invention is to provide for skewering and pulling the meat up against the holder whereby the meat, even in the form of a thin slice or meat end, can be firmly held and properly sliced either by hand or by machine. Another object of the invention is to provide for imparting to the meat hooks a motion of translation in which there is no rotation and in which all the parts of the meat hooks move in the same way for first penetrating the meat, then skewering the meat, and then drawing the meat by means of the skewering against the holding plate. Another object of the invention is to provide an efficient, reliable and comparatively simple meat holder.

Other objects of the invention will appear from the following description and the invention may be said, generally stated, to consist of a meat holder embodying in combination a plate or surface against which the meat is pulled and skewer means adapted to enter and skewer the meat and then pull it against said surface by a motion of translation, and the invention further comprises the improvements to be presently described and finally claimed.

In the description reference will be made to the accompanying drawings forming part hereof and in which—

Figure 1:
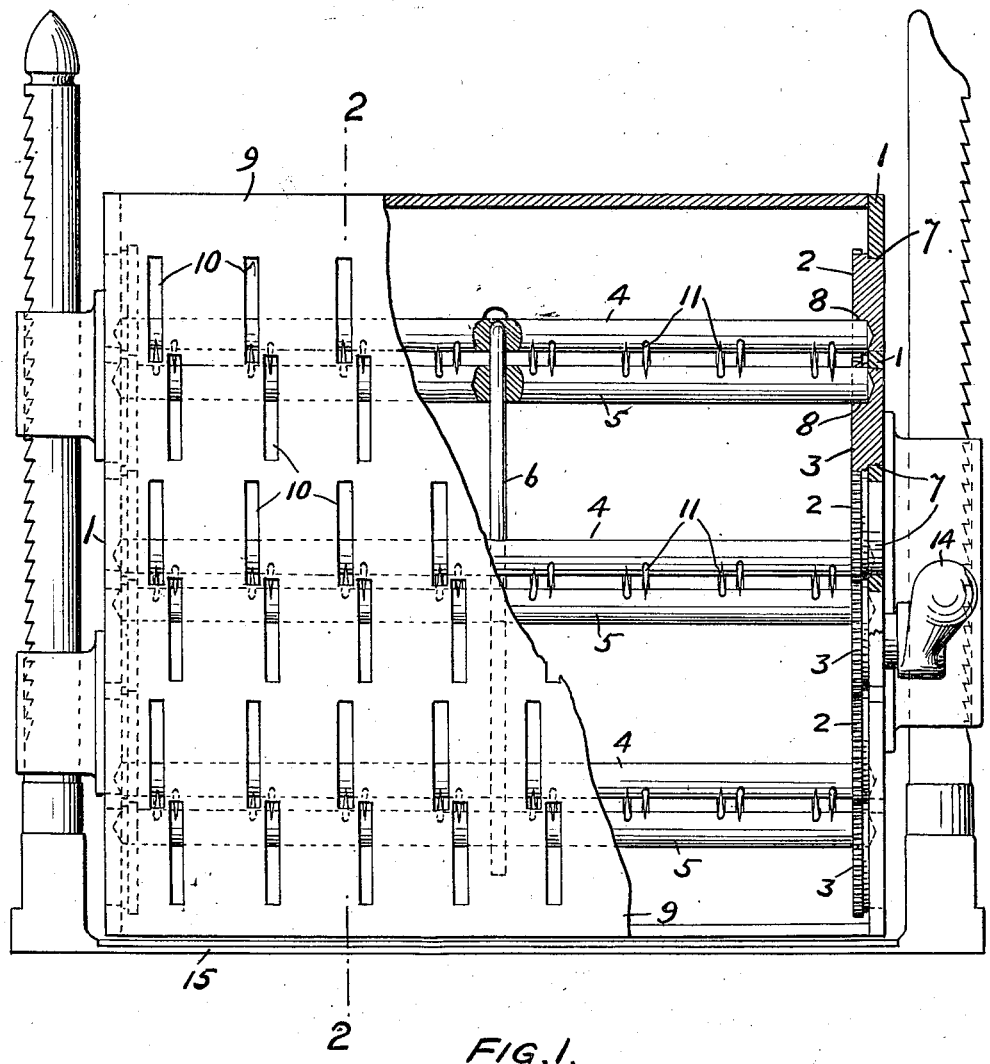
Figure 1 is a front view of a meat holder embodying features of the invention and drawn with parts broken away and with parts in section.
Figure 3:
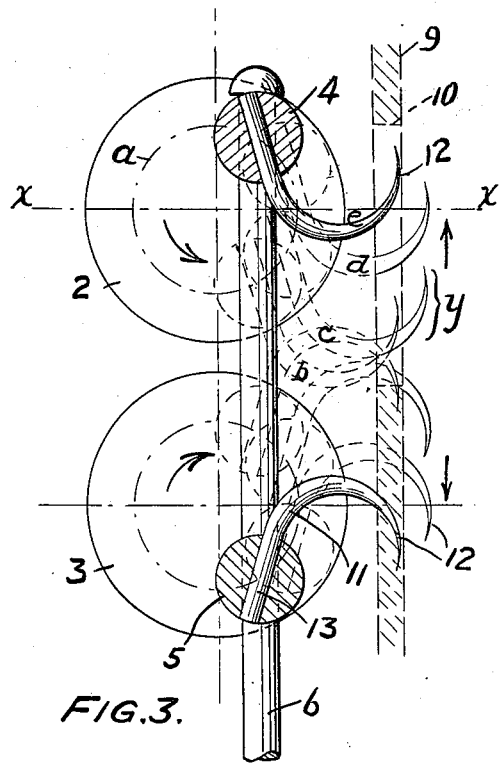
Fig. 3 is a diagrammatic view illustrative of the movement of translation of the skewer means.
Figure 2:
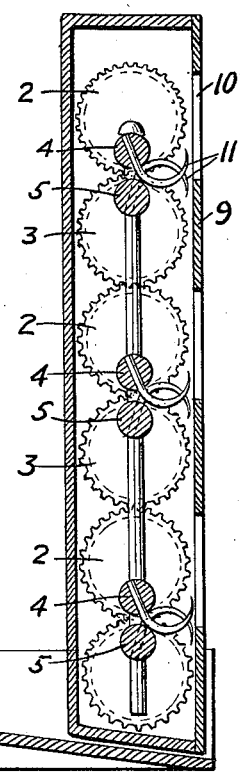
Fig. 2 is a transverse sectional view on the line 2—2 of Figure 1 with parts omitted.

In the drawings 1 are standards or side pieces and they each carry intermeshing gears of which six are shown for each standard but they may be considered in pairs 2 and 3, and since the three pairs for each standard are duplicates a description of one pair will suffice. 4 and 5 are a pair of rods of which three pairs are shown and of which one pair will be described, because the pairs are all alike. The rod 4 is arranged eccentrically of the center of rotation of the gear wheels 2 which it connects or spans, and the rod 5 is similarly arranged with respect to the gear wheels 3. These rods 4 and 5 do not turn about their axes, being prevented from doing so by the pin 6, which passes through openings provided in them, but the gear wheels 2 and 3 turn in respect to these rods. As shown hubs 7 of the gear wheels are arranged through openings in the standards to allow the wheels to turn about their own centers, and the ends of the rods enter sockets 8 provided in the gear wheels in order to keep the hubs 7 in the described position and in order to permit the gear wheels to turn whilst the rods do not turn. 9 is a plate or surface against which the meat is drawn and which is provided with slots or openings 10 for a purpose to be presently described. 11, generally, are skewers or hooks and they are shown to consist of bills 12 and shanks 13. The shanks 13 are rigidly connected with the rods 4 and 5 and the bills of the hooks that are connected with the rods 4 are shown as reversely arranged in respect to the bills of the hooks that are connected with the rods 5. The skewers 11 work in the slots 10. 14 is a handle connected with one of the gear wheels and by which they are all turned about their respective centers since they are all interconnected. 15 indicates parts of a slicing machine well understood and therefore not illustrated or described in detail and with which a holder embodying features of the invention may be employed. A description of the mode of operation of one of the hooks or curved skewers 11 will be given. Referring to Fig. 3, the rod 4 travels in the direction indicated by the arrow with its axis in the circular path indicated by the dotted circle $a$. Beginning with the curved skewer or hook in the position $b$, the positions of the skewer are shown at $c$, $d$ and $e$, reference being made to the curved skewer at the upper part of the figure, and the movements of the curved skewer at the lower part of the figure are the same but in reverse direction. Referring to the curved skewer at the top of the figure, it will be observed that the pin 6 prevents the rod 4 from turning and that the motion of the curved skewer is one of translation in its own plane and may be described by saying that it proceeds beginning with position $b$ quite rapidly toward the right, at the center line $x$—$x$ its motion is principally toward the top of the sheet, and above the line $x$—$x$ its movement is toward the left and in all positions it is parallel to itself. If therefore we consider the action upon meat disposed to the right of the plate 9 in Figure 1, it can be said that the curved skewer first is merely pushed into the meat with the portion $y$ thereof entering the meat more or less facewise, then the point of the curved skewer travels upward and into the meat parallel with the face thereof that lies toward the part 9, and then the curved skewer upon which the meat is thus impaled moves toward the left above the line $x$—$x$ and pulls the meat up against the face of the part 9 and in some cases the meat may enter the slot 10 slightly, although that is not in all cases essential. From this description of the movements and operation of one curved skewer the mode of operation of the meat holder can be readily understood bearing in mind that the curved skewers are reversed so that the skewering or impaling effect of one set is opposed by the other seat and thus the meat is not shifted up or down but is firmly held against such motion and is pulled up to place and firmly held on the meat holder.

It will be obvious to those skilled in the art to which the invention relates that modifications may be made in details of construction and arrangement without departing from the spirit of the invention which is not limited as to those matters or otherwise than the prior art and the appended claim may require.

I claim:

In a meat holder the combination of gears revoluble about their centers, rods eccentrically connected with the faces of the gears, means for preventing rotation of the rods about their own axes, curved skewers rigid with the rods, and a slotted surface with which the curved skewers co-operate by motion of translation to pull the meat against the surface.

WILLIAM F. H. BRAUN.